(12) United States Patent
Shirai et al.

(10) Patent No.: US 6,844,607 B2
(45) Date of Patent: Jan. 18, 2005

(54) PHOTODIODE ARRAY DEVICE, A PHOTODIODE MODULE, AND A STRUCTURE FOR CONNECTING THE PHOTODIODE MODULE AND AN OPTICAL CONNECTOR

(75) Inventors: Takehiro Shirai, Tokyo (JP); Masayuki Iwase, Tokyo (JP); Takeshi Higuchi, Tokyo (JP); Naoki Tsukiji, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 4 days.

(21) Appl. No.: 10/068,423

(22) Filed: Feb. 4, 2002

(65) Prior Publication Data

US 2002/0185702 A1 Dec. 12, 2002

Related U.S. Application Data

(63) Continuation-in-part of application No. 09/969,292, filed on Oct. 1, 2001, now abandoned.

(30) Foreign Application Priority Data

Oct. 6, 2000 (JP) .......................................... 2000-307638
Mar. 5, 2001 (JP) .......................................... 2001-028208

(51) Int. Cl.[7] .............................................. H01L 29/72
(52) U.S. Cl. ........................ 257/443; 257/225; 257/436; 257/446

(58) Field of Search .................................. 257/225, 436, 257/443, 446, 444, 445, 448, 460

(56) References Cited

U.S. PATENT DOCUMENTS

| 5,337,384 | A | | 8/1994 | Basavanhally et al. |
| 5,721,429 | A | | 2/1998 | Radford et al. |
| 6,100,570 | A | * | 8/2000 | Saito .......................... 257/446 |

FOREIGN PATENT DOCUMENTS

| EP | 0 428 159 A1 | 5/1991 |
| EP | 0 756 185 A2 | 1/1997 |
| EP | 0 773 591 A2 | 5/1997 |
| WO | WO 99 53547 | 10/1999 |

* cited by examiner

*Primary Examiner*—Edward Wojciechowicz
(74) *Attorney, Agent, or Firm*—Knobbe Martens Olson & Bear LLP

(57) ABSTRACT

A photodiode array device having an absorption layer and a cladding layer formed on one surface of a single substrate, anodes formed on the cladding layer, a cathode formed on the other surface of the substrate, and a plurality of light-receiving regions; a photodiode module including the photodiode array device; and a structure for connecting the photodiode module and an optical connector. The photodiode array device has trenches formed on the one surface of the substrate and having such a depth as to divide the absorption layer into subdivisions, for cutting off propagation of light between adjacent light-receiving regions.

25 Claims, 4 Drawing Sheets

PHOTODIODE ARRAY DEVICE, A PHOTODIODE MODULE, AND A STRUCTURE FOR CONNECTING THE PHOTODIODE MODULE AND AN OPTICAL CONNECTOR

CROSS REFERENCE TO RELATED APPLICATION

This application is a continuation in part of U.S. patent application Ser. No. 09/969,292 entitled "PHOTODIODE ARRAY DEVICE, A PHOTODIODE MODULE, AND A STRUCTURE FOR CONNECTING THE PHOTODIODE MODULE AND AN OPTICAL CONNECTOR" filed on Oct. 1, 2001 now abandoned. The disclosure of the above-described filed application is hereby incorporated by reference in its entirety.

FIELD OF THE INVENTION

The present invention relates to a photodiode array device including an array of photodiodes, a photodiode module provide, with the photodiode array device, and a structure for connecting the photodiode module and an optical connector.

BACKGROUND OF THE INVENTION

A conventional photodiode array device using photodiodes, for example, a planar photodiode array device 1 shown in FIG. 6 has an absorption layer (i-InGaAs) 1b and a cladding layer (i-InP) 1c both formed on one surface of a substrate ($n^+$-InP) 1a. Four light-receiving regions 1d, which are $p^+$ regions, are formed in the absorption layer 1b and the cladding layer 1c by diffusing Zn. Also, a plurality of anode rings 1e are formed on the cladding layer 1c. A cathode 1f, which is a thin Au—Ge layer, is formed over the other surface of the substrate 1a. In this photodiode array device 1, incident light is converted into electricity by the absorption layer 1b, and the resulting photocurrent is output from the anode ring 1e.

In FIG. 6, hatching is omitted in order to avoid intricacy of lines, and this is the case with FIGS. 1, 3A to 3E and 5 referred to in the following description.

SUMMARY OF THE INVENTION

An object of the present invention is to provide a photodiode array device capable of suppressing crosstalk between adjacent light-receiving regions, a photodiode module provided with the photodiode array device, and a structure for connecting the photodiode module and an optical connector.

To achieve the above object, the present invention provides a photodiode array device comprising: a single substrate; an absorption layer and a cladding layer formed on one surface of the substrate; anodes formed on the cladding layer; a cathode formed on the other surface of the substrate; and a plurality of light-receiving regions, wherein a trench is formed on said one surface of the substrate and has such a depth as to divide the absorption layer into subdivisions, for cutting off propagation of light between adjacent ones of the light-receiving regions.

Also, to achieve the above object, the present invention provides a photodiode module comprising: an optical bench provided with the above photodiode array device; and a package to which the optical bench is fixed and which has wiring electrically connected to the photodiode array device.

Further, to achieve the above object, the present invention provides a structure for connecting a photodiode module and an optical connector, wherein the above photodiode module is connected to an optical connector having an optical connector ferrule and optical fibers.

The present invention makes it possible to provide a photodiode array device capable of suppressing crosstalk between adjacent light-receiving regions, a photodiode module provided with the photodiode array device, and a structure for connecting the photodiode module and an optical connector.

The above and other objects, features and advantages of the present invention will become apparent from the following description when taken in conjunction with the accompanying drawings.

DETAILED DESCRIPTION

A photodiode array device and a photodiode module according to embodiments of the present invention will be hereinafter described in detail with reference to FIGS. 1 through 5 wherein a planar photodiode array device using photodiodes of pin structure is illustrated, by way of example.

Figure 1:
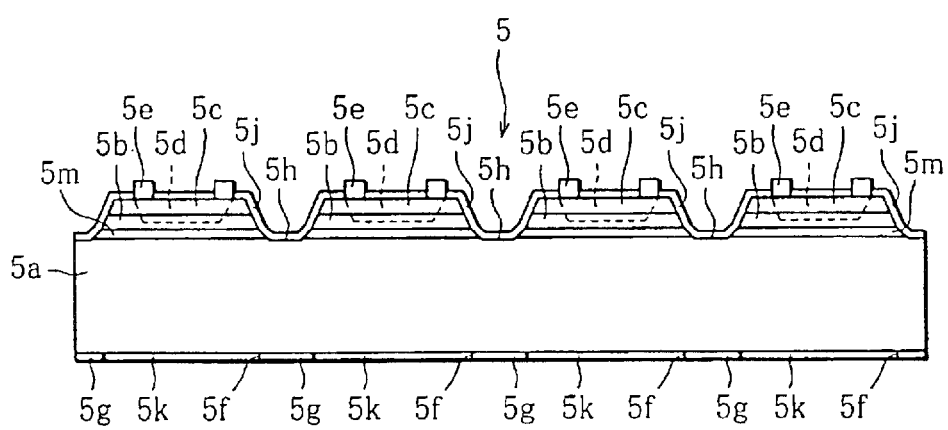
FIG. 1 is a sectional front view of a photodiode array device according to the present invention.

As shown in FIG. 1, a photodiode array device 5 has a substrate 5a of $n^+$-InP, an absorption layer 5b of i-InGaAs and a cladding layer 5c of i-InP formed on one surface of the substrate 5a with a buffer layer 5m of $n^-$-InP interposed therebetween. Four light-receiving regions 5d, which are $p^+$ regions, are formed in the absorption layer 5b and the cladding layer 5c by diffusing Zn, so as to be arranged in one direction. The light-receiving regions 5d may alternatively be arranged in two dimensions to form a plurality of rows, instead of being aligned in one direction. Ring-like anodes 5e are formed on the surface of the cladding layer 5c.

The buffer layer 5m functions as a layer for mitigating the lattice mismatching between the substrate 5a and the absorption layer 5b, and thus is not indispensable to the photodiode array device 5.

Figure 2:
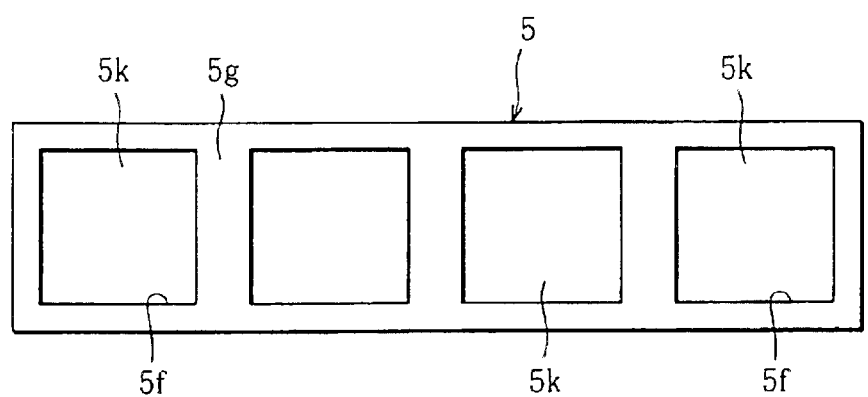
FIG. 2 is a bottom view of the photo diode array device of FIG. 1.

In this photodiode array device 5, a cathode 5g, which is a thin Au—Ge layer with windows 5f, is formed on the other surface of the substrate 5a. The windows 5f are formed at locations corresponding to the respective light-receiving regions 5d. Further, as shown in FIGS. 1 and 2, the photodiode array device 5 has trenches 5h each formed between adjacent light-receiving regions 5d and having a depth reaching the substrate 5a so as to divide the absorption layer 5b into subdivisions, for cutting off propagation of light (in this example, light of infrared region) between the light-receiving regions 5*d*. Also, antireflection layers 5*j* and 5*k*, each made of silicon nitride (SiN$_x$) and serving as a protective layer, are formed over the entire surface on the same side as the cladding layer 5*c*, except the anodes 5*e*, and in the individual windows 5*f*, respectively.

The photodiode array device 5 constructed as described above is produced in the manner explained below.

Figure 3A:
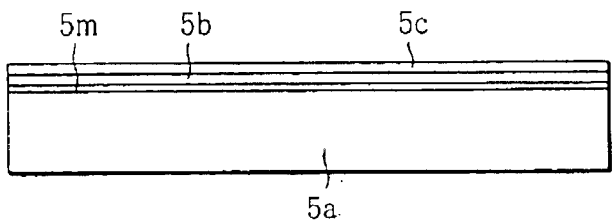
FIGS. 3A to 3E are views illustrating respective steps of a process for producing the photodiode array device of FIG. 1.

First, as shown in FIG. 3A, an absorption layer 5*b* of InGaAs and a cladding layer 5*c* of InP are formed on one surface of the substrate 5*a*.

Figure 3B:
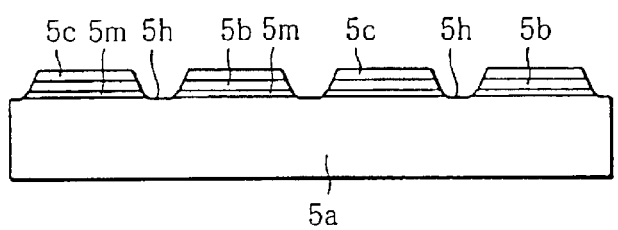

Then, the substrate surface on the same side as the cladding layer 5*c* is subjected to etching, to form a plurality of trenches 5*h* deeper than the absorption layer 5*b* and reaching the substrate 5*a*, as shown in FIG. 3B, thereby isolating light-receiving regions 5*d* to be formed in the subsequent step from each other. The etching process employed in this case may be dry etching or wet etching using a suitable solution, for example. The trenches 5*h* may alternatively be formed by machining.

Figure 3C:
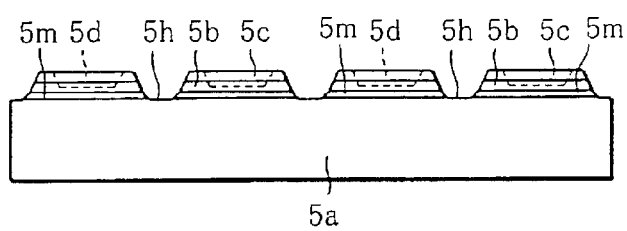

Subsequently, Zn is diffused into the absorption layer 5*b* and the cladding layer 5*c* by vapor- or solid-phase diffusion, to form four light-receiving regions 5*d*, as indicated by the dashed lines in FIG. 3C.

Figure 3D:
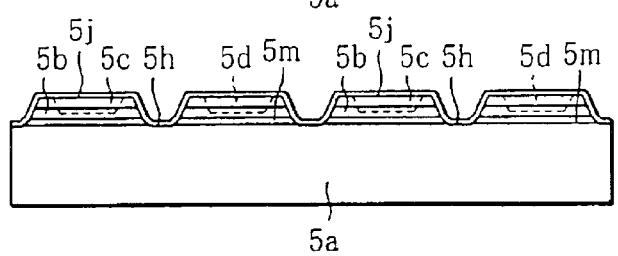

Then, as shown in FIG. 3D, an antireflection layer 5*j* of silicon nitride (SiN$_x$) is formed over the entire surface of the structure on the same side as the cladding layer 5*c* by PCVD (Plasma Chemical Vapor Deposition).

Subsequently, the antireflection layer 5*j* is partly removed from the cladding layer 5*c* by dry etching or wet etching using a suitable solution, to form ring-like exposed regions, and using electron beam vapor deposition, anodes 5*e* of Ti/Pt/Au are formed on the respective exposed regions (see FIG. 3E).

When forming the anodes 5*e*, PGMMEA (propylene glycol monomethyl ether acetate) having a viscosity of 25.90 mPa.s and a photosensitivity of 150 to 240 mJ.cm$^2$ was used as the photoresist to facilitate the patterning as well as the lift-off step, because the trenches 5*h* formed were inversely tapered like V-grooves.

Figure 3E:
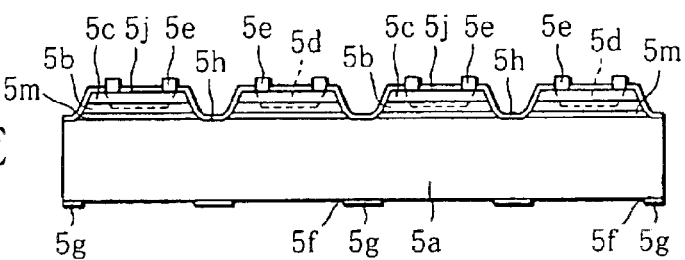

Subsequently, a cathode 5*g*, which is a thin Au—Ge layer having window is 1*f*, is formed on the other surface of the substrate 5*a*, as shown in FIG. 3E, thus completing the production of the photodiode array device 5 of FIG. 1 having four light-receiving regions 5*d*, that is, 4-channel light-receiving regions 5*d*.

In the above structure, an antireflection layer 5*k* of silicon nitride (SiN$_x$) may be formed in each of the windows 5*f* by PCVD.

Thus, the photodiode array device 5 has 4-channel light-receiving regions 5*d*. Accordingly, light incident on each light-receiving region 5*d* of the photodiode array device 5 is converted into electricity by the absorption layer 5*b*, and the resulting photocurrent is output from the corresponding anode 5*e*. In this case, since the photodiode array device 5 has the trenches 5*h* each formed between adjacent light-receiving regions 5*d*, light incident on any one of the light-receiving regions 5*d* is prevented from entering the neighboring light-receiving regions 5*d* by the trenches 5*h*, whereby crosstalk can be suppressed.

Figure 6:
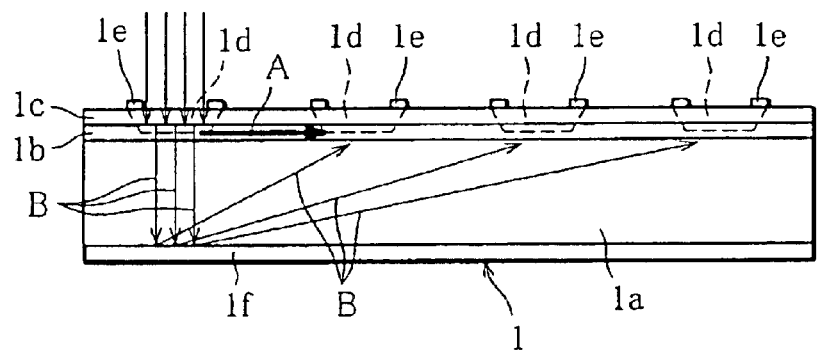
FIG. 6 is a sectional front view of a conventional photodiode array device.

In the conventional photodiode array device 1 shown in FIG. 6, by contrast, light incident on a certain light-receiving region 1*d* can propagate along the a layer 1*b* and reach a neighboring light-receiving region 1*d* as diffused light, as indicated by arrow A. Also, the substrate 1*a* of the conventional photodiode array device 1 is optically transparent; therefore, part of incident light that was not converted into electricity by the absorption layer 1*b* can propagate through the substrate 1*a*, be reflected at the interface between the substrate and the cathode 1*f*, and reach the other light-receiving regions 1*d* as diffused light diffused through the substrate 1*a*, as indicated by arrows B. Compared with the photodiode array device 5 of the present invention, therefore, the conventional photodiode array device 1 is disadvantageous in that photocurrent is more likely to be output in the absence of incident light, that is, crosstalk is more liable to occur.

In the photodiode array device 5 of the present invention, moreover, the cathode 5*g* has a plurality of windows 5*f* formed therein and the antireflection layers 5*k* are formed in the respective windows 5*f*. Accordingly, even if part of incident light that was not converted into electricity by the absorption layer 5*b* propagates through the substrate 5*a*, such leakage light is allowed to pass through the antireflection layer 5*k* to the outside, without being reflected at the inner surface of the substrate 5*a*. Thus, with the photodiode array device 5 having the antireflection layers 5*k* formed in the respective windows 5*f*, diffused light attributable to the reflection o incident light at the inner surface of the substrate 5*a* can be suppressed and thus prevented from entering the neighboring light-receiving regions 5*d*. Consequently, the photodiode array device 5 can suppress crosstalk not only by the effect of the trenches 5*h* but also by the effect of the antireflection layers 5*k*.

To confirm the crosstalk suppression effect, three types of photodiode array devices, that is, a photodiode array device having the conventional structure shown in FIG. 6, photodiode array devices 5 provided with the trenches 5*h* only, and photodiode array devices 5 provided with the windows 5*f* only, were prepared, and with respect to each device, a crosstalk value (dB) was calculated based on the measured value of photocurrent output from a given anode 5*e*. The results are shown in Table 1 given below, wherein the measured values are expressed as a standard deviation (σ) from the crosstalk value a criterion observed with the photodiode array device of the conventional structure shown in FIG. 6.

In Table 1, "Trenches" represents the structure of the photodiode array device 5 provided with the trenches 5*h* only, and "Windows" represents the structure of the photodiode array device 5 provided only with the windows 5*f* having the antireflection layers 5*k* formed therein. Also, in Table 1, the column "1ch" indicates values of improvement in crosstalk measured with respect to one light-receiving region 5*d* with light caused to fall on a neighboring light-receiving region 5*d*, and the column "3ch" indicates values of improvement in crosstalk measured with respect to one light-receiving region 5*d* with light caused to fall on the remaining three light-receiving regions 5*d*. The crosstalk improvement value (dB) was calculated according to the following equation:

Crosstalk improvement value (dB)=−10×log($I_{NO}/I_{IN}$)

where $I_{NO}$ is the measured value of photocurrent of the light-receiving region with no light incident thereon, and $I_{IN}$ is the measured value of photocurrent of the light-receiving region with light incident thereon.

TABLE 1

| Device structure | Incident light | | | | Number of samples (n) |
|---|---|---|---|---|---|
| | 1ch | | 3ch | | |
| | Mean | σ | Mean | σ | |
| Trenches | −3.49 | 1.60 | −2.83 | 1.41 | n = 6 |
| Windows | −2.75 | 1.27 | −1.43 | 0.83 | n = 4 |

The measurement results shown in Table 1 reveal that the photodiode array device 5 provided with the trenches 5h has a higher crosstalk reduction effect than the photodiode array device 5 provided with the windows 5f only. From this it follows that the photodiode array device 5 of FIG. 1 provided with both the trenches 5h and the windows 5f can reduce crosstalk more effectively than the photodiode array device provided with only the trenches 5h or the windows 5f.

Further, the crosstalk suppression effect was observed on photodiode array devices 5 that were different in the thickness of the absorption layer 5b, in the following way: In the measurement condition where photoelectric power PIN was 5 dBm and reverse voltage Vr was 3.0 V, light was caused to fall on a particular light-receiving region 5d, and crosstalk (dB) was obtained from the amount of light measured in an adjacent light-receiving region 5d.

The result was that a photodiode array device 5 having an absorption layer 5b thickness of 3±0.2 μm showed an average crosstalk $T_{x1\,of}$ −41.55 dB, while a photodiode array device 5 having an absorption layer 5b thickness of 6±0.4 μm showed an average crosstalk $T_x$ of −45.1 dB.

The photodiode array device 5 constructed as described above is used in a photodiode module having the below-mentioned structure, for example.

Figure 4A:
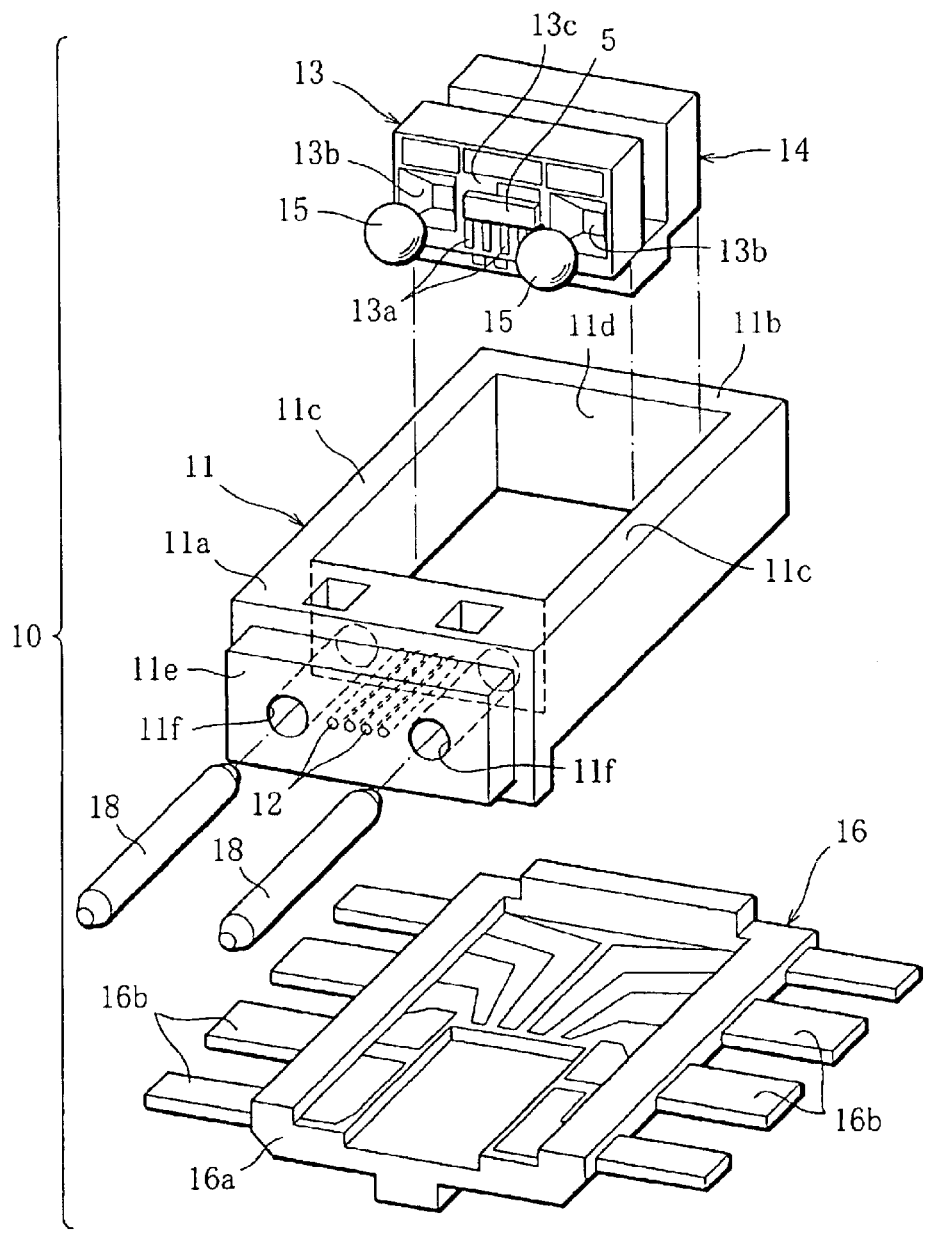
FIG. 4A is an exploded perspective view of a photodiode module using the photodiode array device of FIG. 1.
Figure 4B:
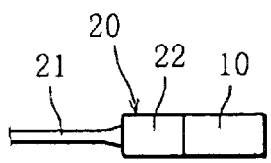
FIG. 4B is a plan view showing a structure for connecting the photodiode module and an optical connector.

As shown in FIG. 4A, a photodiode module 10 comprises a ferrule 11, an optical bench 13, a wiring component 14 for electrical connection, two balls 15, and a lead frame package 16.

The ferrule 11 is a hollow rectangular parallelepipedic member having a rectangular opening in the center thereof, as a receiving section 11d, surrounded by a front wall 11a, a rear wall 11b and two side walls 11c. The front wall 11a has a projection 11e protruding therefrom. Also, the ferrule 11 has two pin holes 11f extending through the front wall 11a and the projection 11e and located side by side in a width direction thereof, and four fiber holes located between the two pin holes 11f. An optical fiber 12 such as a single-mode fiber or graded-index fiber is inserted into and securely bonded to each of the four fiber holes.

The optical bench 13 is made of a material capable of transmitting the light incident on the photodiode array device 5 therethrough, and ceramic, silicon, resin molding, etc. may be used, for example. Preferably, in order that the leakage light from the photodiode array device 5 may not be reflected at the surface, the optical bench 13 is made of a material capable of transmitting or absorbing the light (e.g., silicon, transparent material, or a black-colored material), or an antireflection section is provided by making a window for transmitting the light or a V-groove for absorbing the light. In the illustrated example, the substrate used in the optical bench is made of silicon, which is a transparent material, and electrodes are formed on the surface of the substrate; therefore, windows are formed at the electrodes which correspond in position to the respective windows 5f of the photodiode array device 5 so that the leakage light which has transmitted through the photodiode array device 5 may be allowed to pass through the silicon substrate as well. The photodiode array device 5 is attached to a central portion of the front surface of the optical bench 13, and also a lead pattern 13a with a predetermined shape is formed on the front surface. Further, V-groove 13b each in the form of a truncated pyramid are formed in the front surface of the optical bench 13 on opposite sides of the photodiode array device 5.

The wiring component 14 for electrical connection has leads (not shown) projecting from a rear surface thereof.

The balls 15 are placed between the respective pin holes 11f opening in the inner surface of the front wall 11a and the respective V-groove 13b, to position the light-receiving regions 5d of the photodiode array device 5 with respect to the corresponding optical fibers 12.

The lead frame package 16 includes a frame 16a on which a lead pattern 16c constituting electrical wiring is formed, and lead terminals 16b having distal ends protruding from the frame 16a in the width direction.

In the photodiode module 10 configured as described above, the photodiode array device 5 is bonded at its front surface to the inner surface of the front wall 11a of the ferrule 11 by light-transmissible resin, and the optical bench 13, the electrical connection wiring component 14, the two balls 15 and the lead frame package 16 are encapsulated in the ferrule 11 by synthetic resin poured into the receiving section 11d from above thee ferrule.

The photodiode module 10 is then butt-jointed, by means of guide pins 18 inserted into the respective pin holes 11f, to an optical connector, such as an MT (Mechanical Transferable) connector, which has pin holes formed therein at locations corresponding to the respective guide pins. Such an optical connector may be the one shown in FIG. 4B. This optical connector 20 has optical fibers 21 and an optical connector ferrule 22 to which ends of the optical fibers 21 are connected, and the optical fibers and the optical connector ferrule are bonded together by adhesive etc. Optical signals transmitted through the optical fibers of the optical connector are input to the corresponding light-receiving regions 5d of the photodiode array device 5 through the optical fibers 12 of the photodiode module 10, and the resulting photocurrents are output from the respective anodes 5e.

Generally, in the photodiode array device, light incident on the light-receiving region is converted into electricity by the absorption layer. Theoretically, the thicker the absorption layer, the higher absorptance of light the absorption layer has, reducing the quantity of light transmitted through to the substrate side, so that crosstalk can be lessened. For example, in the case of the photodiode array device according to this embodiment, the absorption layer 5b theoretically has an absorptance of about 95% if the thickness thereof is 3 μm, and has an absorptance of about 99.8% if the thickness is 6 μm.

Figure 5:
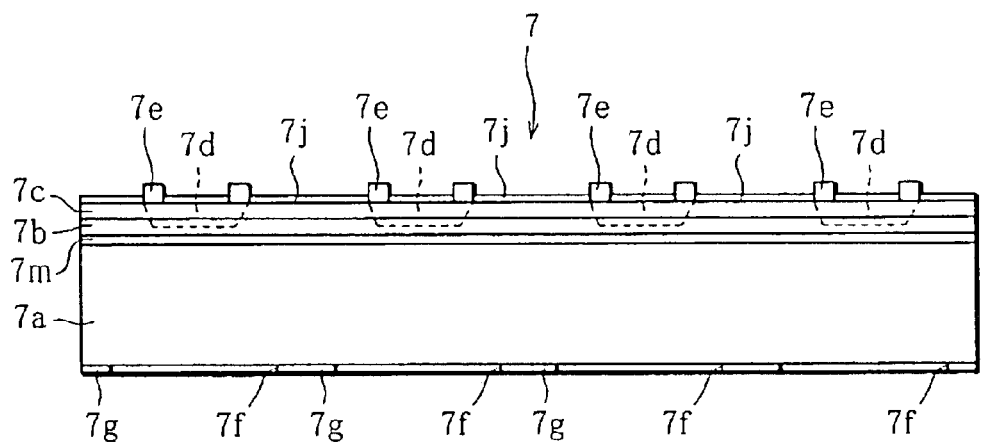
FIG. 5 is a sectional front view of a photodiode array device according to another embodiment of the present invention.

In view of this, two photodiode array devices 7 with the structure shown in FIG. 5 were prepared which had absorption layers with different thicknesses, and the intensity of light transmitted through to a window 7f was measured for the purpose of comparison.

As shown in FIG. 5, in the photodiode array device 7, an absorption layer 7b of i-InGaAs and a cladding layer 7c of $n^-$-InP are formed on one surface of a substrate 7a of $n^+$-InP with a buffer layer 7m of $n^-$-InP interposed therebetween. Four light-receiving regions 7d, which are $p^+$ regions, are formed in the absorption layer 7b and the cladding layer 7c by diffusing Zn, such that the light-receiving regions are arranged in the longitudinal direction of the device. Four ring-like anodes 7e are formed on the surface of the cladding layer 7c.

Further, in the photodiode array device 7, a cathode 7g, which is a thin Au—Ge layer having windows 7f, is formed on the other surface of the substrate 7a. The windows 7f are formed at locations corresponding to the respective light-receiving regions 7d.

In the two photodiode array devices 7 prepared in this manner, the buffer layer 7m had a thickness of 1.2±0.1 µm, the cladding layer 7c had a thickness of 1.2±0.1 µm, and the absorption layer 7b had different thicknesses of 3±0.2 µm and 5.7±0.4 µm.

With an optical fiber placed relative to each of the two photodiode array devices 7 such that a distal end thereof is positioned right under a window 7f located at an identical position, light transmitted through the window 7f was introduced into an optical power meter for measurement, and also light incident on the corresponding light-receiving region 7d was measured in like manner. Based on the obtained transmittances (=quantity of transmitted light/quantity of incident light×100), the transmitted light intensities were compared with each other. As a result, the absorption layer 7b of 3±0.2 µm thick showed a transmittance of about 3%, while the absorption layer 7b of 5.7±0.4 µm thick showed a transmittance of about 0.9%, proving much higher absorptance of the thicker absorption layer 7b. Consequently, with the photodiode array device 7 whose absorption layer 7b has a thickness of 6.0 µm or more, the quantity of light transmitted through the absorption layer 7b to the substrate 7a can be greatly reduced, making it possible to reduce crosstalk more effectively.

Where the thickness of the absorption layer 7b is set to 6 µm or more, the trenches formed in the photodiode array device 7 preferably have a depth of 9 µm or more so as to divide the absorption layer 7b completely into subdivisions.

In the foregoing embodiment, the photodiode array device including pin photodiodes is explained by way of example. Needless to say, the photodiode array device to which the present invention is applied is lot limited to this type of device, and the invention can be used with all types of photodiodes that utilize internal photoelectric effect, such as pn photodiodes, Schottky photodiodes and avalanche photodiodes.

What is claimed is:

1. A photodiode array comprising:
    a semiconductor substrate having a first surface and a second surface opposite said first surface;
    a stacking structure disposed on said first surface, said stacking structure including at least one semiconductor layer formed in said structure for making a junction for photoelectric conversion, the junction being substantially parallel to said first surface and located on said first surface or apart from said first surface;
    at least a trench formed in and through said stacking structure including the semiconductor layer making a junction for photoelectric conversion, said trench extending at least to said first surface and dividing said semiconductor layer into sections;
    a first electrode partially formed on each of the sections of said stacking structure allowing an incident of light on the section;
    a second electrode formed on said second surface; and
    windows formed in the second electrode and located at positions corresponding to the sections of the stacking structure for allowing the incident light to pass through said second surface.

2. The photodiode array of claim 1, further comprising an antireflection layer formed in each of said windows.

3. The photodiode array of claim 1, further comprising antireflection layers covering each of the sections and said trench.

4. The photodiode array of claim 1, wherein said stacking structure further includes a buffer layer formed between said first surface of said substrate and said semiconductor layer.

5. The photodiode array of claim 1, wherein said first electrode has a ring-like shape.

6. A photodiode array comprising:
    a substrate having a first surface and a second surface opposite said first surface;
    an absorption layer formed on said first surface and including a light receiving region therein;
    a cladding layer formed on said absorption layer;
    a plurality of anodes formed on said cladding layer;
    at least one trench formed in and through said absorption layer and said cladding layer and dividing said layers into sections; and
    a cathode deposited on said second surface, wherein said cathode comprises windows formed therein and exposing an area on the second surface corresponding to at least a portion of the light receiving region.

7. The photodiode array of claim 6, further comprising an antireflection layer formed in each of said windows.

8. The photodiode array of claim 6, further comprising a buffer layer formed between said first surface of said substrate and said absorption layer.

9. The photodiode array of claim 6, wherein said plurality of anodes are ring shaped.

10. The photodiode array of claim 6, wherein said absorption layer has a thickness of at least 3 µm.

11. A photodiode array made with a method comprising:
    depositing an absorption layer on a first surface of a substrate;
    depositing at least one electrical contact on a second opposing surface of said substrate, and having at least one window exposing one or more locations on the second opposing surface of the substrate corresponding to selected regions of said absorption layer; and
    forming a plurality of trenches having a depth so as to divide said absorption layer into subdivisions.

12. A photodiode array comprising an absorption layer deposited on a first surface of a substrate, a plurality of light receiving regions formed in said absorption layer, a plurality of trenches formed between adjacent light receiving regions such that said absorption layer is divided into subdivisions, and an electrical contact on a second surface of the substrate opposite the first surface of the substrate, the electrical contact having at least one window exposing a portion of the substrate corresponding to one of the plurality of light receiving regions, wherein said absorption layer has a thickness of at least 3 µm, and wherein said trenches are at least about 9 µm deep.

13. A photodiode array comprising:
    an optically transparent substrate;
    a layered structure deposited on a first surface of the substrate, said layered structure comprising at least two light absorbing portions;
    an electrical contact on a second surface of the substrate and including a plurality of windows, each of the plurality of windows positioned to expose a portion of the substrate opposite the light absorbing portions; and
    at least one trench formed into said layered structure and positioned between said at least two light absorbing portions.

14. A photodiode array comprising:

an optically transparent substrate having first and second opposing surfaces;

a plurality of light absorbing regions formed in a stacked structure on the first surface of the substrate; and means for reducing crosstalk by inhibiting light transfer between at least two of said light absorbing regions, wherein said means comprises both trenches and a windowed cathode.

15. The photodiode array of claim 14, wherein said means comprises an anti-reflective coating on at least some surfaces of said array.

16. The photodiode array of claim 1, wherein the junction is a PIN junction, and wherein said semiconductor substrate is made of n-type InP and said semiconductor stacking structure includes a buffer layer made of n-type InP formed on said first surface, an insulator layer made of InGaAs formed on the buffer layer, and a p-type layer made of p-type InP formed on the insulator layer.

17. The photodiode array of claim 16, wherein p-type dopants are partially diffused into the insulator layer.

18. The photodiode array of claim 17, wherein the insulator layer has a thickness of 3 $\mu$m or more.

19. The photodiode array of claim 18, wherein the insulator layer has a thickness of 6 $\mu$m or more.

20. The photodiode array of claim 17, wherein the p-type dopants are Zn.

21. The photodiode array of claim 16, wherein said first electrode is an anode and said second electrode is a cathode.

22. The photodiode array of claim 21, wherein said first electrode has a ring-like shape.

23. The photodiode array of claim 22, wherein said first electrode includes Ti, Pt, and Au.

24. The photodiode array of claim 21, wherein said first electrode has a square-like shape.

25. The photodiode array of claim 24, wherein said first electrode includes Au and Ge.

* * * * *